Patented Jan. 18, 1938

2,105,919

UNITED STATES PATENT OFFICE 2,105,919

WATER INSOLUBLE ORTHO-DISAZO DYESTUFFS AND FIBER DYED THEREWITH

Erwin Hoffa and Hans Heyna, Frankfort-on-the-Main, Germany, assignors to General Aniline Works, Inc., New York, N. Y., a corporation of Delaware No Drawing. Application January 27, 1934, Serial No. 708,691. In Germany February 2, 1933

8 Claims. (Cl. 260—84)

The present invention relates to water-insoluble ortho-disazo dyestuffs and to fiber dyed therewith; more particularly it relates to dyestuffs having the following general formula:

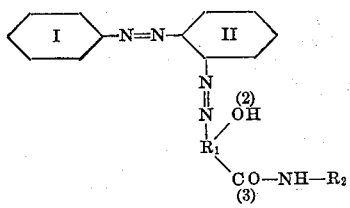

wherein $R_1$ stands for a naphthalene, anthracene, carbazole or benzocarbazole radical, $R_2$ means a radical of the benzene or naphthalene series and wherein the nuclei signified by I and II are substituted by methyl, halogen, alkoxy, phenoxy, nitro, trifluoromethyl, alkylsulfonyl, arylsulfonyl, sulfonic acid-dialkyl-amino, N-methyl-ethane-sulfamino or carboxylic acid-alkyl-ester groups.

We have found that valuable water-insoluble orthodisazo dyestuffs are obtainable by diazotizing substitution products of 2-amino-1,1'-azobenzene and coupling them with hydroxy-arylcarboxylic acid arylides, such as arylides of 2,3-hydroxynaphthoic acid, of 2,3-hydroxyanthracene carboxylic acid, of ortho-hydroxycarbazole carboxylic acids, of ortho-hydroxybenzocarbazole carboxylic acids, or with compounds containing a reactive methylene group capable of coupling with diazo compounds, such as pyrazolone derivatives or arylides or esters of beta-keto-carboxylic acids, among which arylides of acetoacetic acid, benzoylacetic acid, terephthaloyl-diacetic acid and other acylacetic acids, or diacylacetyl arylamines, such as diacetoacetylbenzidine or -tolidine, may be mentioned. The components used for preparing the dyestuffs must not contain any group lending solubility such as the sulfonic acid or carboxylic acid group.

The dyestuffs correspond probably to the type:

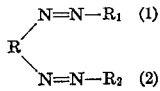

wherein R and $R_1$ represent substituted benzene radicals and $R_2$ means the radical of an hydroxy-aryl-carboxylic acid arylide, of a β-keto-carboxylic acid ester and of a β-keto-carboxylic acid arylide or of a pyrazolone derivative.

The smooth course of the diazotization and the coupling must be regarded as highly surprising. (Cf. "Künstliche organische Farbstoffe" of Fierz-David, 1926, III$^{rd}$ vol., page 106). In this manner it is possible to prepare dyestuffs which may be used for the same purposes as the azo dyestuffs hitherto known. The dyestuffs may be prepared either in substance, on the fiber or on any of the usual substrata adapted for the production of lakes.

In comparison with the para-disazodyestuffs which may be obtained according to U. S. Patent No. 1,871,947 by coupling diazotized para-aminoazo compounds of the benzene series with 2,3-hydroxynaphthoic acid arylides, the ortho-disazo dyestuffs of the present invention are distinguished by an essentially better fastness to boiling lye (boiling for 6 hours at atmospheric pressure with 100 cc. of caustic soda solution of 40° Bé. in 10,000 cc. of water per 1000 grams of material).

The following examples serve to illustrate the invention but they are not intended to limit it thereto, the parts being by weight, unless stated otherwise:

(1) Cotton fiber is padded in the usual manner with the following grounding liquor: 12 parts of 1-(2',3'-hydroxy-naphthoylamino)-2-methyl-4-chlorobenzene, 36 parts by volume of caustic soda solution of 34° Bé., 24 parts by volume of sodium Turkey red oil of 50% strength, 500 parts by volume of hot water are made up with water to 1000 parts by volume. Thereupon, the dyeing is developed with the following diazo solution: 2.8 parts of 4-methyl-2-amino-2',4'-dichloroazobenzene are stirred together with 5.2 parts by volume of hydrochloric acid of 22° Bé. and ice-cold water; 0.7 part of sodium nitrite are dissolved in water and added thereto. When the diazotization is finished, the whole is made up with water to 800 parts by volume and rendered neutral by means of sodium acetate. After washing and soaping at the boil, the dyeing represents a Bordeaux-red tint having a very good fastness to washing and to chlorine.

The dyestuff corresponds to the following formula:

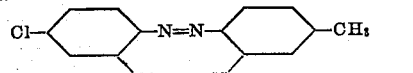
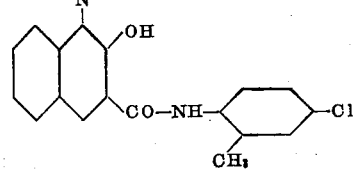

(2) Cotton fiber is grounded as stated in Example 1 with 5 parts of 2,3-hydroxynaphthoyl-aminobenzene, 7.5 parts by volume of caustic soda solution of 30° Bé., 10 parts by volume of Turkey red oil of 50% strength and 5 parts by volume of formaldehyde of 33% strength. The dyeing is developed with the following diazo solution: 3.1 parts of 5-methyl-4-methoxy-2-amino-2',4'-dichloroazobenzene are diazotized as described in Example 1 and the diazo solution is rendered neutral. The dyeing is washed and soaped at the boil and represents a red-brown tint of very good fastness to washing and to chlorine.

The dyestuff corresponds to the following formula:

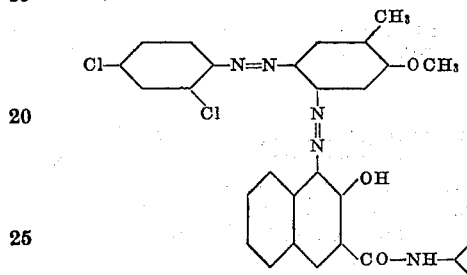

(3) 3.1 parts of 5-methyl-4-methoxy-2-amino-2',5'-dichloroazobenzene are stirred with 5.2 parts by volume of hydrochloric acid of 22° Bé. and ice-cold water and 0.7 part of sodium nitrite, dissolved in water, is added thereto. When the diazotization is finished, water is added until the whole has become dissolved; then the product is coupled in acetic acid solution with 2.2 parts of finely divided aceto-acetic acid-ortho-chloroanilide. The dyestuff is filtered by suction and washed out; it represents a yellow powder and has the following constitution:

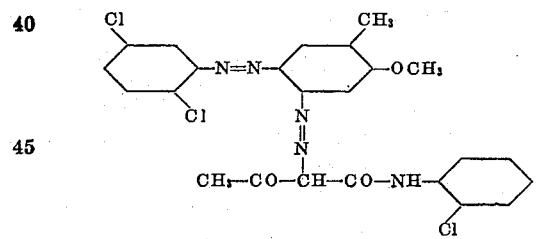

(4) The diazo solution mentioned in Example 3 is coupled with 1.8 parts of finely divided 1-phenyl-3-methyl-5-pyrazolone. The dyestuff is filtered by suction and washed out; it forms a red powder and possesses the following formula:

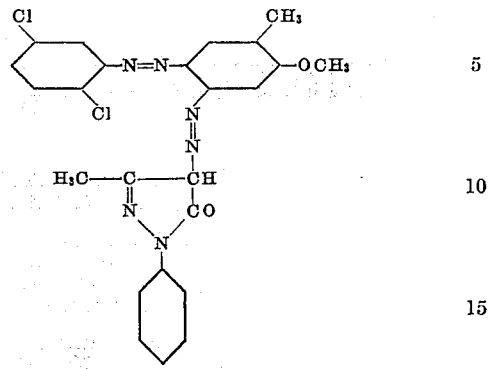

(5) Cotton fiber is grounded as described in Example 2. The dyeing is developed with the following diazo solution: 3.2 parts of 5-methyl-4-methoxy-2-amino-2'-chloro-4'-nitroazobenzene are diazotized as described in Example 1 and the diazo solution obtained is neutralized. The dyeing which has been washed and soaped at the boil represents a deep brown shade of very good fastness to washing and to chlorine, and of very good dischargeability. The dyestuff corresponds to the following formula:

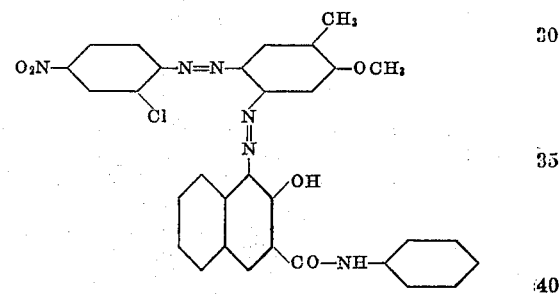

By using, instead of 2,3-hydroxynaphthoyl-aminobenzene, 1-(2',3'-hydroxynaphthoylamino)-2-methylbenzene for the grounding liquor, a dark olive-brown dyeing is obtained; by using 1-(2',3'-hydroxynaphthoylamino)-4-methoxybenzene there is obtained a deep yellowish-brown. Both dyeings possess a very good fastness to washing and to chlorine, and a very good dischargeability.

The following table indicates a further number of other ortho-disazo-dyestuffs, obtainable according to the present invention:

| | Diazo compound from: | Coupled with the following arylide of 2,3-hydroxynaphthoic acid: | Shade |
|---|---|---|---|
| 1 | 5-methyl-4-methoxy-2-amino-4'-chloroazobenzene | Anilide | Red-brown. |
| 2 | 5-methyl-4-methoxy-2-amino-2'-methoxyazobenzene | do | Yellowish brown. |
| 3 | 5-methyl-4-methoxy-2-amino-4'-methoxyazobenzene | do | Do. |
| 4 | 5-methyl-4-methoxy-2-amino-2',4'-dimethylazobenzene | do | Reddish brown. |
| 5 | 5-methyl-4-methoxy-2-amino-3'-nitro-4'-methoxyazobenzene | do | Yellowish brown. |
| 6 | 5-methyl-4-methoxy-2-amino-2'-methoxy-5'-nitroazobenzene | do | Deep brown. |
| 7 | 5-methyl-4-methoxy-2-amino-4'-nitroazobenzene | do | Yellowish brown. |
| 8 | 5-methyl-4-methoxy-2-amino-2',6'-dichloro-4'-nitroazobenzene | do | Deep reddish brown. |
| 9 | 5-methyl-4-methoxy-2-amino-2'-methoxy-4'-nitroazobenzene | do | Do. |
| 10 | 5-methyl-4-methoxy-2-amino-2',5'-dimethoxy-4'-nitroazobenzene | do | Yellowish brown. |
| 11 | 5-methyl-4-methoxy-2-amino-2'-methyl-4'-nitroazobenzene. | do | Deep reddish brown. |
| 12 | 5-methyl-4-methoxy-2-amino-3'-methyl-4'-nitroazobenzene. | do | Very yellowish brown. |
| 13 | 5-methyl-4-methoxy-2-amino-2'-4'-dinitroazobenzene. | do | Deep olive-brown. |
| 14 | 5-methyl-4-ethoxy-2-amino-2'-chloro-4'-nitroazobenzene. | do | Deep brown. |
| 15 | 4,5-dimethyl-2-amino-4'-nitroazobenzene. | do | Red-brown. |

| | Diazo compound from: | Coupled with the following arylide of 2,3-hydroxy-naphthoic acid: | Shade |
|---|---|---|---|
| 16 | 5-chloro-4-methoxy-2-amino-2'-chloro-4'-nitroazobenzene. | Anilide | Deep black—brown. |
| 17 | 4,5-dimethoxy-2-amino-2'-chloro-4'-nitroazobenzene. | do | Olive-brown-black. |
| 18 | 5-methyl-4-methoxy-2-amino-2'-4'-dichloroazobenzene. | Para-anisidide | Red-brown. |
| 19 | do | Para-chloroanilide | Do. |
| 20 | do | Beta-naphthylamide | Do. |
| 21 | do | 3-methyl-4-anisidide | Do. |
| 22 | 5-methyl-4-methoxy-2-amino-2'-nitro-4'-methylazobenzene. | Anilide | Do. |
| 23 | do | Para-anisidide | Do. |
| 24 | do | 3-methyl-4-anisidide | Do. |
| 25 | do | 2-methyl-4-anisidide | Do. |
| 26 | do | Beta-naphthylamide | Do. |
| 27 | do | Para-chloroanilide | Do. |
| 28 | do | Para-toluidide | Do. |
| 29 | 5-methyl-4-methoxy-2-amino-2'-methoxy-4'-nitroazobenzene. | Para-anisidide | Brown. |
| 30 | do | 3-methyl-4-anisidide | Do. |
| 31 | do | 2-methyl-4-anisidide | Black-brown. |
| 32 | 5-methyl-4-methoxy-2-amino-2',5'-dichloroazobenzene. | Para-anisidide | Red-brown. |
| 33 | do | Para-toluidide | Do. |
| 34 | 5-methyl-4-methoxy-2-amino-2'-methyl-4'-nitroazobenzene. | Ortho-toluidide | Do. |
| 35 | | Beta-naphthylamide | Dark red-brown. |
| 36 | do | Para-anisidide | Dark brown. |
| 37 | do | 2-methyl-4-anisidide | Do. |
| 38 | do | 3-methyl-4-anisidide | Do. |
| 39 | 5-methyl-4-methoxy-2-amino-2'-chloro-4'-nitroazobenzene. | 2-methyl-4-anisidide | Do. |
| 40 | do | 3-methyl-4-anisidide | Black-brown. |
| 41 | do | 2,5-dimethoxy-anilide | Dark brown. |
| 42 | do | Ortho-anisidide | Black-brown. |
| 43 | do | Beta-naphthylamide | Dark brown. |
| 44 | do | 5-chloro-2-toluidide | Black-brown. |
| 45 | do | Alpha-naphthylamide | Dark brown. |
| 46 | do | Meta-nitranilide | Do. |
| 47 | do | Para-chloroanilide | Do. |
| 48 | 5-methyl-4-methoxy-2-amino-4'-nitroazobenzene. | Para-anisidide | Brown. |
| 49 | do | 3-methyl-4-anisidide | Do. |
| 50 | do | Para-toluidide | Do. |
| 51 | 5-methyl-4-methoxy-2-amino-2'-nitro-4'-chloroazobenzene. | Anilide | Red-brown. |
| 52 | do | 2,5-dimethoxy-anilide | Dark red-brown. |
| 53 | do | Ortho-anisidide | Do. |
| 54 | do | Para-anisidide | Vivid red-brown. |
| 55 | do | Para-chloroanilide | Do. |
| 56 | do | Para-toluidide | Do. |
| 57 | 5-methyl-4-methoxy-2-amino-2'-nitro-4'-methoxyazobenzene. | Anilide | Copper-brown. |
| 58 | do | Para-anisidide | Red-brown. |
| 59 | do | 3-methyl-4-anisidide | Do. |
| 60 | do | Para-chloroanilide | Copper-brown. |
| 61 | do | Para-toluidide | Do. |
| 62 | 5-methyl-4-methoxy-2-amino-2'-nethoxy-5'-nitroazobenzene. | Para-anisidide | Reddish brown. |
| 63 | do | 3-methyl-4-anisidide | Do. |
| 64 | do | Ortho-toluidide | Khaki. |
| 65 | do | Para-chloro-anilide | Red-brown. |
| 66 | 5-methyl-4-methoxy-2-amino-2',6'-dichloro-4'-nitroazobenzene. | Para-anisidide | Dark brown. |
| 67 | do | 3-methyl-4-anisidide | Do. |
| 68 | do | Beta-naphthylamide | Do. |
| 69 | do | Meta-nitranilide | Do. |
| 70 | do | Para-chloroanilide | Do. |
| 71 | 5-methyl-4-methoxy-2-amino-4'-chloroazobenzene. | 2-methyl-4-anisidide | Do. |
| 72 | do | Para-anisidide | Red-brown. |
| 73 | do | Beta-naphthylamide | Do. |
| 74 | do | Meta-nitranilide | Dark red-brown. |
| 75 | 5-methyl-4-methoxy-2-amino-2',4'-dimethylazobenzene. | Para-anisidide | Red-brown. |
| 76 | do | 3-methyl-4-anisidide | Do. |
| 77 | 5-methyl-4-ethoxy-2-amino-2'-chloro-4'-nitroazobenzene. | Ortho-toluidide | Dark brown. |
| 78 | do | Para-anisidide | Brown. |
| 79 | do | 3-methyl-4-anisidide | Black-brown. |
| 80 | do | Para-chloroanilide | Dark brown. |
| 81 | 4,5-dimethyl-2-amino-4'-nitroazobenzene. | Ortho-toluidide | Dark red-brown. |
| 82 | do | Para-anisidide | Do. |
| 83 | do | 3-methyl-4-anisidide | Do. |
| 84 | do | Para-toluidide | Do. |
| 85 | 5-chloro-4-methoxy-2-amino-2'-chloro-4'-nitroazobenzene. | Para-anisidide | Do. |
| 86 | do | 3-methyl-4-anisidide | Do. |
| 87 | do | Alpha-naphthyl-amide | Dark violet-brown. |
| 88 | do | Para-chloroanilide | Dark brown. |
| 89 | do | Meta-nitranilide | Black-brown. |
| 90 | 4,5-dimethoxy-2-amino-2'-chloro-4'-nitroazobenzene. | 2-methyl-4-anisidide | Olive. |
| 91 | 5-methyl-4-methoxy-2-amino-4'-chloro-5'-methyl-2'-sulfodimethylamide-azobenzene. | Para-chloroanilide | Red-brown. |
| 92 | do | Para-anisidide | Do. |
| 93 | 5-methyl-4-methoxy-2-amino-2'-nitro-4'-trifluoromethyl-azobenzene. | Anilide | Brown. |
| 94 | do | Ortho-anisidide | Dark brown. |
| 95 | 5-methyl-4-methoxy-2-amino-2'-methyl-sulfonyl-5'-trifluoromethyl-azobenzene. | do | Red-brown. |
| 96 | 5-nitro-4-methoxy-2-amino-2'-nitroazobenzene. | 2-methyl-4-anisidide | Brown-red. |

|   |   | Diazo compound from: | Coupled with the following arylide of 2, 3-hydroxynaphthoic acid: | Shade |
|---|---|---|---|---|
|   | 97 | 5-nitro-4-methoxy-2-amino-2'-chloroazobenzene. | Para-anisidide | Brown-red. |
|   | 98 | 5-methyl-4-methoxy-2-amino-2',4'-dibromoazobenzene. | Anilide | Red-brown. |
|   | 99 | 5-methyl-4-methoxy-2-amino-2'-ethoxy-4'-nitro-5'-methylazobenzene. | Ortho-anisidide | Yellowish brown |
|   | 100 | 5-methyl-4-methoxy-2-amino-4'-phenoxyazobenzene. | Anilide | Do. |
|   | 101 | 4,5-dimethyl-2-amino-2'-chloro-4'-nitroazobenzene. | ___do___ | Black-brown. |
|   | 102 | 5-methyl-4-methoxy-2-amino-4'-N-methyl-ethanesulfamide-azobenzene. | Ortho-anisidide | Red-brown. |
|   | 103 | 5-methyl-4-methoxy-2-amino-2'-carboxylic acid-methyl-ester-azobenzene. | Anilide | Brown-red. |
|   | 104 | 5-methyl-4-methoxy-2-amino-2'-phenylsulfonyl-4'-nitroazobenzene. | ___do___ | Brown. |

|   |   | Diazo compound from | Coupled with | Shade |
|---|---|---|---|---|
|   | 105 | 5-methyl-4-methoxy-2-amino-2'chloro-5'-nitroazobenzene. | 1-(3'-hydroxy-7',8'-benzocarbazole-2'-carbonylamino)-2-methyl-4-methoxybenzene. | Blue-gray. |
|   | 106 | 5-methyl-4-methoxy-2-amino-2'-methyl-5'-chloroazobenzene. | 1-(3'-hydroxy-7',8'-benzocarbazole-2'-carbonylamino)-2-methyl-4-methoxybenzene. | Khaki-olive. |
|   | 107 | 5-methyl-4-methoxy-2-amino-2'-methoxy-5'-nitroazobenzene. | 1-(2'-hydroxycarbazole-3'-carbonylamino)-4-chlorobenzene. | Yellow-brown. |
|   | 108 | 5-methyl-4-methoxy-2-amino-2'-nitro-4'-methoxy-azobenzene. | 1-(2'-hydroxyanthracene-3'-carbonylamino)-2-methylbenzene. | Olive. |
|   | 109 | 4,5-dimethoxy-2-amino-2'-chloro-4'-nitroazobenzene. | ___do___ | Black-green. |
|   | 110 | 5-methyl-4-methoxy-2-amino-2'-chloro-4'-methylazobenzene. | ___do___ | Olive green. |
|   | 111 | 5-methyl-4-methoxy-2-amino-2'-nitro-4'-chloroazobenzene. | 1-(3'-hydroxy-7',8'-benzocarbazole-2'-carbonylamino)-4-methoxybenzene. | Mole-brown. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:

1. The water-insoluble ortho-disazo dyestuff of the following formula:

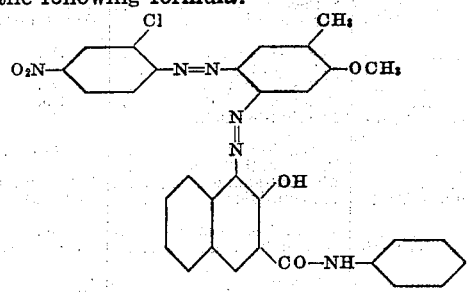

yielding, when produced on the fiber, a deep brown dyeing of very good fastness to washing and to chlorine and of very good dischargeability.

2. The water-insoluble ortho-disazo dyestuff of the following formula:

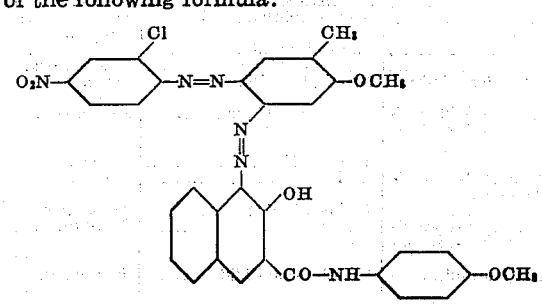

yielding, when produced on the fiber, a deep yellowish-brown dyeing of very good fastness to washing and to chlorine and of very good dischargeability.

3. The water-insoluble ortho-disazo dyestuff of the following formula:

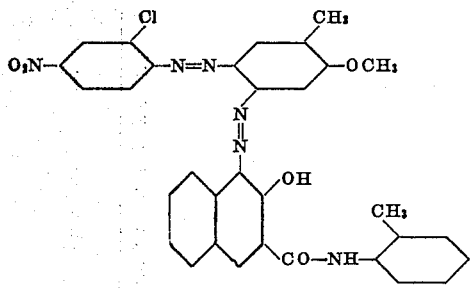

yielding, when produced on the fiber, a dark olive-brown dyeing of very good fastness to washing and to chlorine and of very good dischargeability.

4. The water-insoluble ortho-disazo dyestuffs of the following general formula:

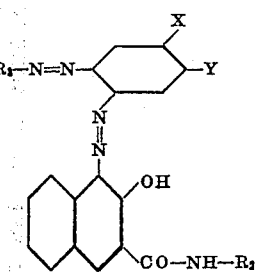

wherein $R_2$ means a member of the group consisting of radicals of the benzene and naphthalene series, $R_3$ stands for a radical of the group consisting of halogen-phenyl, dihalogen-phenyl, halogen-methyl-phenyl, nitro-phenyl, dinitro-phenyl, nitro-halogen-phenyl, nitro-dihalogen-phenyl, nitro-methyl-phenyl, nitro-dimethylphenyl, nitro-alkoxy-phenyl, nitro-dialkoxy-phenyl, nitro-trifluoro-methyl-phenyl, nitro-arylsulfonyl-phenyl and nitro-alkoxy-methyl-phenyl, X stands for a member of the group consisting of hydrogen, alkoxy, methyl, halogen and nitro and Y for a member of the group consisting of a methyl and alkoxy, yielding, when produced on the fiber, brown dyeings of good fastness properties, particularly of very good fastness to washing and to chlorine.

5. Fiber dyed with the ortho-disazo dyestuff as claimed in claim 1.
6. Fiber dyed with the ortho-disazo dyestuff as claimed in claim 2.
7. Fiber dyed with the ortho-disazo dyestuff as claimed in claim 3.
8. Fiber dyed with the ortho-disazo dyestuffs as claimed in claim 4.

ERWIN HOFFA.
HANS HEYNA.